United States Patent
Uemura et al.

(10) Patent No.: US 6,920,343 B2
(45) Date of Patent: Jul. 19, 2005

(54) MOBILE INFORMATION TERMINAL APPARATUS

(75) Inventors: Tatsuyuki Uemura, Tachikawa (JP); Akifumi Kabeya, Sagamihara (JP); Toshimasa Akagi, Hachioji (JP); Takashi Suzuki, Chofu (JP); Hideki Okuyama, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 388 days.

(21) Appl. No.: 10/157,699

(22) Filed: May 29, 2002

(65) Prior Publication Data

US 2002/0193082 A1 Dec. 19, 2002

(30) Foreign Application Priority Data

Jun. 1, 2001 (JP) ........................................ 2001-167207

(51) Int. Cl.$^7$ ................................................. H04B 1/38
(52) U.S. Cl. ...................... 455/575.1; 455/572; 429/96; 439/824
(58) Field of Search ................................ 455/572, 573, 455/550.1, 90.1, 347, 348, 349, 575.1; 429/96, 100; 439/824

(56) References Cited

U.S. PATENT DOCUMENTS

| 5,066,235 A | * | 11/1991 | Kobayashi | .................. 439/76.1 |
| 5,384,207 A | * | 1/1995 | Ohtani | ........................... 429/9 |
| 5,607,795 A | * | 3/1997 | Saida | .......................... 429/100 |

\* cited by examiner

Primary Examiner—Lee Nguyen
(74) Attorney, Agent, or Firm—Frishauf, Holtz, Goodman & Chick, P.C.

(57) ABSTRACT

The present invention provides a mobile information terminal apparatus, wherein a power supply terminal formed from a wire having elasticity, in which an electrode contact section is provided between two twisted coil springs, is brought into contact with an electrode of a battery so that feeding is carried out. This realizes a terminal, which does not easily reach the yield point against the degree of deformation caused by an impact with use of its characteristics provided from the wire material, in which the degree of a change in spring force is small against movement of the battery, and which has an excellent following-up property. Accordingly, the mobile information terminal apparatus according to the invention prevents interruption of feeding, or contact failure, etc. caused by an external impact, etc. from occurring therein.

9 Claims, 6 Drawing Sheets

MOBILE INFORMATION TERMINAL APPARATUS

CROSS-REFERENCE TO RELATED APPLICATIONS

This application is based upon and claims the benefit of priority from the prior Japanese Patent Application No. 2001-167207, filed Jun. 1, 2001, the entire contents of which are incorporated herein by reference.

BACKGROUND OF THE INVENTION

1. Field of the Invention

The present invention relates to a mobile information terminal apparatus carrying electronics, in particular, to the mobile information terminal apparatus, which has prodigious strength against the external environment and external impacts and has been improved in preventing a contact failure of a battery for a self-contained power supply.

2. Description of the Related Art

In general, known are various apparatuses, for example, a radio communication apparatus for a mobile telephone etc., a personal computer, a remote control apparatus, a compact type of bar code scanner, and the like as a mobile information terminal apparatus constituted by electronics.

In such a mobile information terminal apparatus, small sizing and light weighting are greatly important and thus its basic functions and basic performance are selected. The memory size of a main memory provided in a body of the apparatus is limited to the extent that basic software necessary for driving or major application software is stored. Therefore, various data are stored in a storage medium such as a detachable memory card etc. When the data are used, the main memory is mounted in the body of the apparatus.

Many of these mobile information terminal apparatuses are configured in that the memory card is inserted in a slot that opens externally and fixed by engaging with a connector, and data are exchanged. In the state that a part of the memory card described above is exposed externally, it is easy to insert and pull out the memory card. On the other hand, in this case, there is a problem such that the memory card comes out of the slot because of an external impact etc. Even a cover is provided for the opening section, there is another problem such that, in the case where the memory card is mounted, a space is made between the opening section and the memory card and, therefore, a drop of water or dust may easily come into the apparatus from the space.

For this reason, the structure for the apparatus has been considered in that such memory card is completely mounted inside the apparatus, the opening section is sealed, and the exposed part of the memory card is eliminated, so that an influence from the external environment or an impact is reduced.

A battery that serves as a driving source of the mobile information terminal apparatus can be considered as a component in which a defect owing to an impact caused by dropping mistakenly the apparatus may easily occurs. It depends on the functions, but the mobile information terminal apparatus consumes large electric power, in general. In order to lengthen the usable time as long as possible, a battery of large capacity, for example, a packed lithium ion battery etc. is used for the apparatus.

In regard to mounting of a battery, a cover of the body of the apparatus is opened and the battery is mounted in a predetermined battery case. At this time, a battery electrode and a power supply terminal on the apparatus side come into contact and connect electrically to each other. In the past, a type that a power supply terminal with lead wire connected is fitted was employed. Therefore, even the battery moved to a certain extent inside the body of the apparatus, the electric connection was not canceled as far as the fitted power supply terminal came off. However, in this type, it is troublesome to replace the battery. What's more, parts and space were required, which is an obstacle concerning its cost and miniaturization of the apparatus. In order to deal with this, the structure is employed in that a case or a guide in which a battery is fitted is formed in the body of the apparatus, and the battery electrode and the terminal on the apparatus side come into contact by only mounting the battery in the case.

In general, since the mobile information terminal apparatus is carried about with a user, the apparatus is often bumped against something or dropped. Therefore, it happens frequently that an exorbitant impact is applied to the apparatus. Taking this into consideration, the body of the apparatus is configured to absorb such impact, or formed with a cover so as to prevent from being damaged. In regard to self-contained electronics such as a memory card etc., on receiving an impact, the electronics happen to come out of connectors. Further, there happens a defect in disconnecting the contact around an internal battery, that is, between the battery and a subject terminal, or an event such that feeding is stopped.

Particularly in a battery, its weight is heavier than the other components. So, when the apparatus receives an impact, the battery has a great influence on the other components. In addition, at that time, a terminal to contact with the battery electrode is occasionally damaged. That is, the terminal is deformed so that its elasticity cannot be recovered. In this case, a contact failure occurs so that feeding is stopped. For this reason, the construction has been employed in that a power supply terminal of the apparatus is formed from platy materials including copper of resilience. Then, even the mounted battery moves to a certain extent, the electric connection is not disconnected.

FIG. 9A is a diagram showing a schematic structure with a view of the state where a battery is mounted in a conventional mobile information terminal apparatus from a side aspect (B—B direction). FIG. 9B is a view enlarging a section of a power supply terminal, and FIG. 9C is a diagram showing a structure viewed from above.

A power supply terminal 31 shown in the drawings is mounted on a printed circuit board 32 provided in the mobile information terminal apparatus. When a battery 33 is fitted, the power supply terminal 31 is brought into the state where it is pressed toward the substrate 32 by its own electrode 34. The power supply terminal 31 is manufactured by pressing a platy material including resilient copper with use of a tool, or the like.

However, in regard to the power supply terminal 31, when an external impact is applied thereto, there are cases where the platy material easily exceeds its allowable stress because of the movement or the vibration of the battery 33 and reaches the yield point of the material. In the case where the material has reached the yield point, it is difficult to recover the resilience of the material. Therefore, a contact failure occurs. Even the platy material does not reach its yield point, there are cases where the platy material of the terminal has metal fatigue owing to vibration caused by the intermittent movement of the battery, the movement generated by irregularity in parts or impacts, so that the resilience of the terminal cannot be recovered. As a result, the contact with the battery becomes unstable easily.

When feeding is stopped during the operation because of the fact described above, a processing operation is stopped. In addition to that, in the case where the apparatus does not have a backup function, the set-up conditions, data under processing, or data to be recorded are lost, thereby losing reliability.

BRIEF SUMMARY OF THE INVENTION

An object of the invention is to provide a mobile information terminal apparatus, which prevents electric interruption caused by an external impact between the electrode of the self-contained battery and the power supply terminal of the apparatus, and performs a stable feeding continuously so as to prevent a processing operation stop or a loss of data.

A mobile information terminal apparatus according to a first aspect of the invention, comprises:

an input section to input information externally;

a display section to display information;

a control section including a board mounted with a circuit element to control a processing of the input information or the display section;

a battery to be fitted so as to supply power for driving to constituting components;

a battery housing section to accommodate the battery, provided in an apparatus body; and a battery cover configured detachably to cover the battery housing section, and further providing, in the battery housing section, a power supply terminal having;

an electrode contact section to come into contact with an electrode of the battery and receive feeding in a case where the battery is fitted in the battery housing section; and a twisted coil spring to energize and bring the electrode contact section into contact with the electrode.

A mobile information terminal apparatus according to a second aspect of the invention, further comprising:

a stopper to restrict a movable range from a free state of an electrode contact section formed in a manner integrated into a twisted coil spring included in the power supply terminal, wherein the stopper restricts a movable range and applies an equipped force even in a case where the battery is not fitted, so as to reduce the degree of a change in spring forces between a state where the battery is fitted and a state where the battery is not fitted.

The mobile information terminal apparatus configured as described above comprises a power supply terminal formed from a wire having elasticity, in which an electrode contact section is provided between two twisted coil springs. The power supply terminal is energized and brought into contact with an electrode of a battery so that feeding is carried out. The power supply terminal does not easily reach the yield point against the degree of deformation caused by an impact with use of its characteristics provided from the wire material, reduces the degree of a change in spring force against movement of the battery, and follows the movement of the battery, thereby maintaining the contact state with the electrode of the battery.

DETAILED DESCRIPTION OF THE INVENTION

Embodiments of the invention now will be described with reference to the accompanying drawings.

Figure 1A:
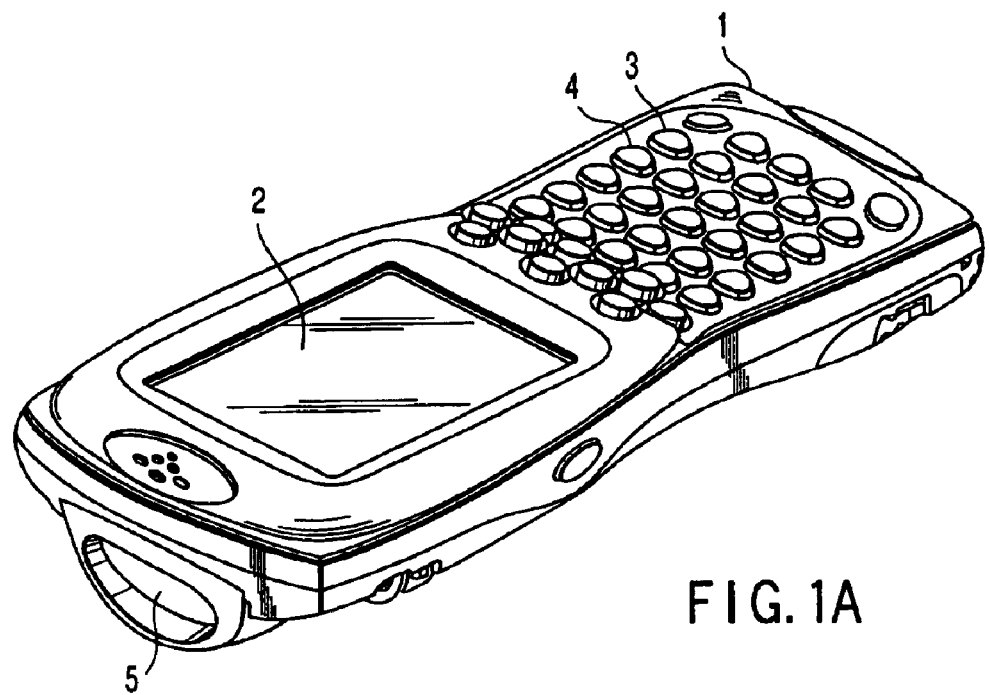
FIGS. 1A and 1B are views illustrating the configuration of a mobile information terminal apparatus to which a power supply terminal according to the invention is applied.
Figure 1B:
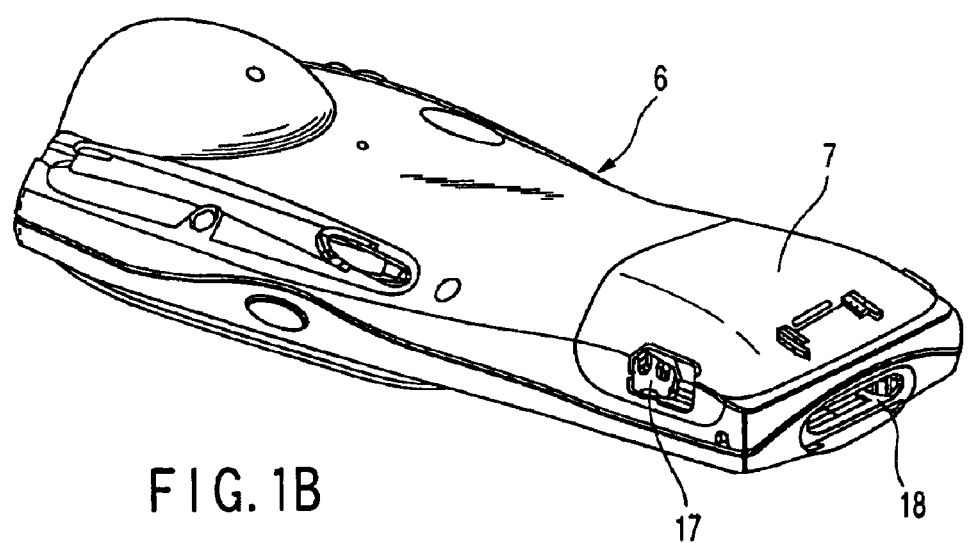

FIGS. 1A and 1B are views illustrating the configuration of a mobile information terminal apparatus having an impact proofing function in a battery, as the first embodiment according to the invention. FIG. 1A shows the configuration of the mobile information terminal apparatus viewed from the front thereof, and FIG. 1B shows the configuration viewed from the rear.

The terminal apparatus 1 is provided on the front with a display 2, which is constituted by a liquid crystal display device etc. to display characters, numerals, or the other information, and an input section 4 with a plurality of keys 3 arrayed, through which an input processing is performed by pressing the keys down. At the top of the apparatus, there is provided a beam window 5 to irradiate a light beam for reading and receive the reflected light so as to read data. In the rear, a detachable battery room cover 7 is fitted in a rear body cover 6. In the battery room cover 7, a lock mechanism 17 is provided so that the battery room cover 7 does not come off inadvertently. At the bottom of the terminal apparatus 1, there is provided a connector 18 to connect externally. In the case where the battery is a rechargeable battery, a charging terminal, which is used for charging while the rechargeable battery is mounted, may be provided as well as a terminal for data communication in the connector 18.

A mounting section for a battery according to the present embodiment now will be described.

Figure 2:
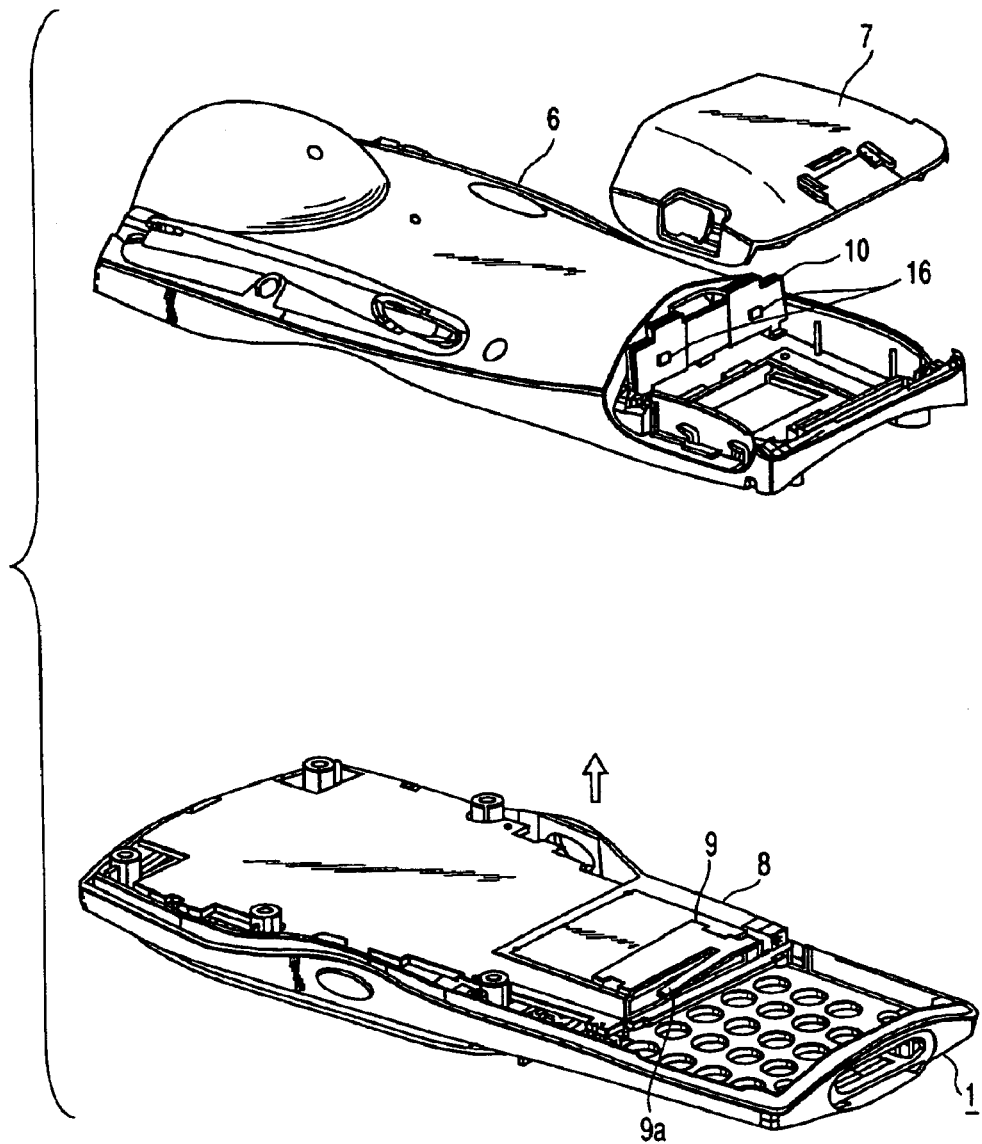
FIG. 2 is a view for explaining a battery room of the mobile information terminal apparatus shown in FIG. 1B.
Figure 3:
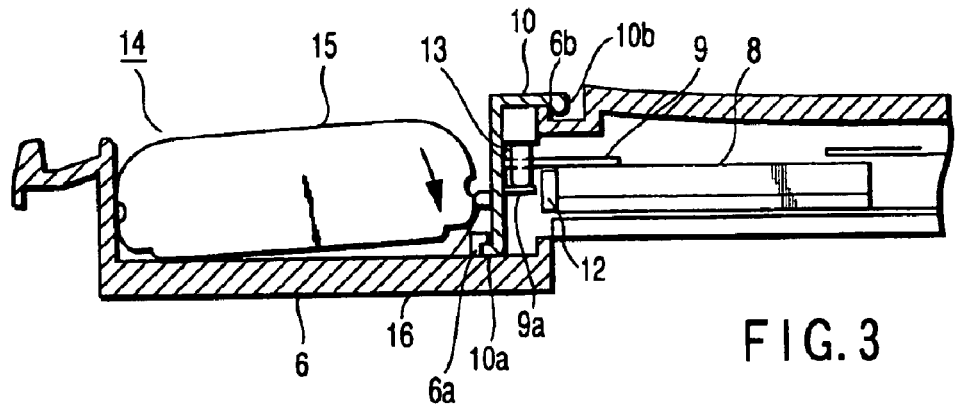
FIG. 3 is a view showing the cross-sectional structure of the battery room for the mobile information terminal apparatus shown in FIG. 1B.

FIG. 2 illustrates the construction of a mounting section for a battery in the state where the case of the apparatus body is separated. FIG. 3 shows the cross-sectional structure of the mounting section in the state where the battery is mounted. According to the embodiment, a battery room 14 is provided between the inside of the rear body cover 6 and a detachable connector door 10. Above the battery room 14, the battery room cover 7 is attached.

When assembled, the connector door 10 is fixed so as to close the opening section of the rear body cover 6. In the opening section, there is disposed a connector body 8 wherein an insertion slot into which a detachable memory card to store application software, or data, etc. opens.

The connector door 10 is formed into an L-shape. At the lower portion of the connector door, there is a nail section 10a to lock in a lower hook 6a provided in the apparatus body. At the upper portion of the connector door, there is a nail section 10b to lock in an upper hook 6b provided in the apparatus body. In the connector door 10, a projection 13 is provided on the rear thereof. In the state the connector door 10 is fitted to the apparatus body, the projection 13 bends and presses a blade spring 9a, which functions as a stopper to prevent the memory card 12 from coming off, down. And further, in the state the connector door 10 is fitted to the apparatus body, a projection 16, which functions as a stopper to prevent a mounted battery 15 from falling out, is provided in the connector door 10.

Figure 4A:
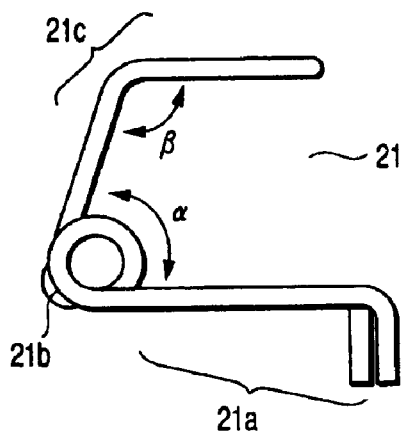
FIGS. 4A and 4B are diagrams showing the structure of the power supply terminal according to the invention.
Figure 4B:
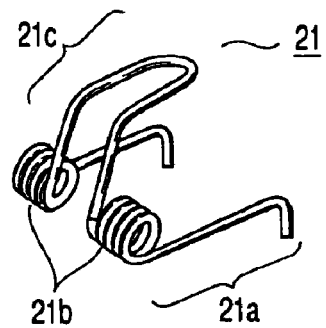
Figure 5A:
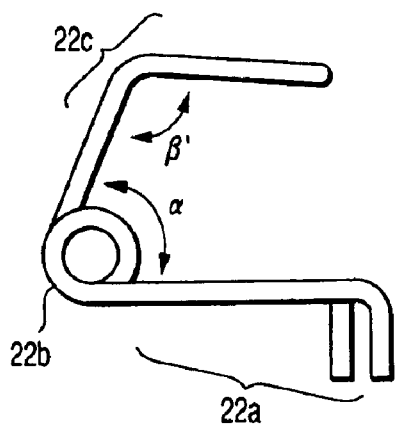
FIGS. 5A and 5B are diagrams showing another structure of the power supply terminal shown in FIGS. 4A and 4B.
Figure 5B:
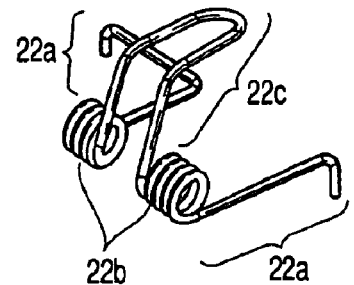
Figure 6A:
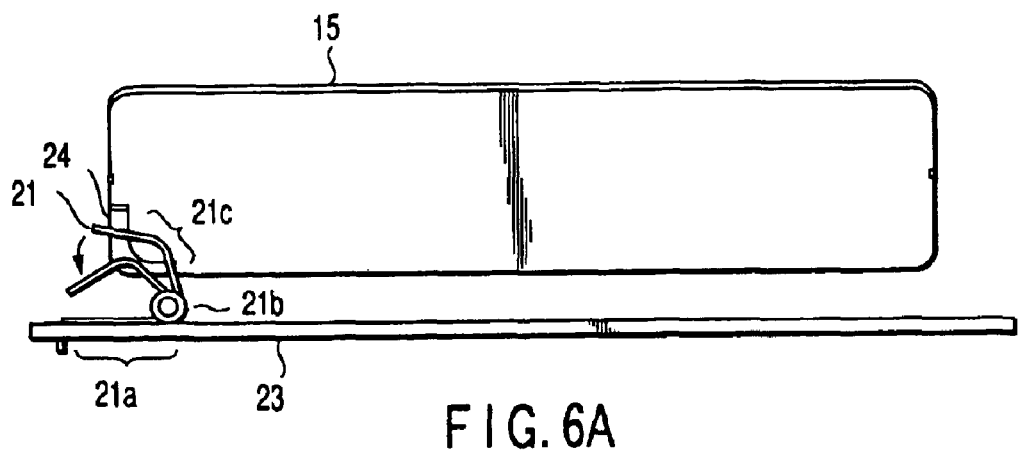
FIGS. 6A and 6B are views showing a state of an operation of fitting a battery with the power supply terminal according to the invention mounted in the mobile information terminal apparatus.
Figure 6B:
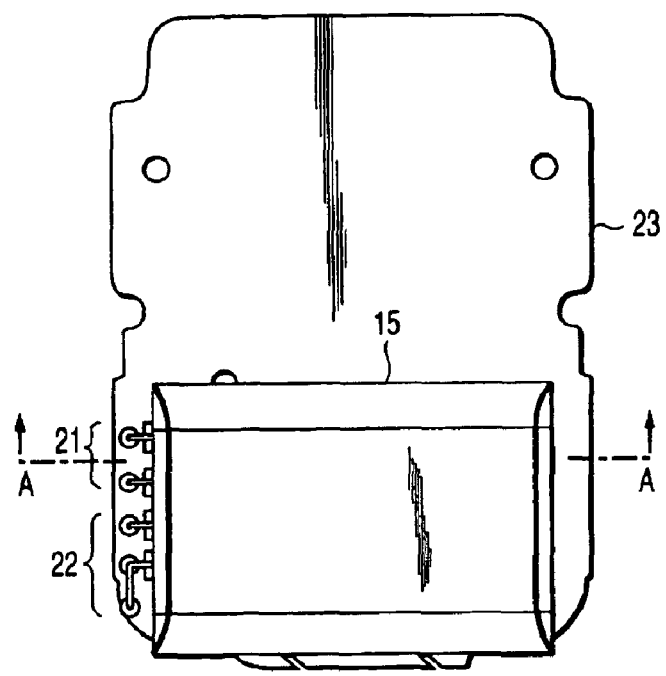

FIGS. 4A and 4B, and FIGS. 5A and 5B illustrate the constructions of double structured twisted coil springs, which serve as power supply terminals 21 and 22, respectively. The power supply terminals 21 and 22 come into contact with a battery electrode when a battery is fitted in the battery room 14. FIG. 4A and FIG. 5A are diagrams showing the constructions of the power supply terminals 21 and 22 viewed from their sides. FIG. 4B and FIG. 5B are perspective views showing the three-dimensional constructions of the power supply terminals 21 and 22 viewed from above. FIG. 6A shows the structure of the power supply terminal viewed from the cross direction (A—A) in the state where the power supply terminal is fixed on a printed circuit board (PCB) 23 provided in the apparatus body. FIG. 6B shows the state viewed from above. In the embodiment, the power supply terminal 21 will be described as an example.

The power supply terminal 21 is formed from an elastic wire. In regard to its shape, insertion fixing sections 2a are formed at both end portions of the wire. At each end portion of the insertion fixing section, the wire is bent into an L-shape so as to fix on the board 23. Two coil spring sections 21b, which function as elastic members, lie halfway between the respective ends and the center of the wire. Each coil spring section opens toward the insertion fixing section 21a and is bent at a predetermined angle of α. An electrode contact section 21c is formed at the section closer to the center of the wire than the coil spring sections. The electrode contact section 21c is bent into a dogleg shape at an angle of β. The power supply terminal 22 includes insertion fixing sections 22a, coil spring sections 22b, and electrode contact section 22c which correspond to the insertion fixing sections 21a, coil spring sections 21b, and electrode contact section 21c of the power supply terminal 21.

For the material of the power supply terminal, a spring material having a low value of resistance, such as beryllium copper, or phosphor bronze, etc. is used. The surface of the material is plated with nickel, or plated with gold on the surface plated first with nickel. In case where it is required that the spring material has protection against corrosion or strong contact pressure in accordance with use environment of the mobile information terminal apparatus, a spring material of stainless may be used as far as a problem concerning the value of resistance can be tolerated. In regard to a plating process as well as the selection of the spring material, the other plating materials can be selected as the need arises. The wire diameter of the twisted coil spring is about 0.2 to 0.8 mm, in general. However, it can be selected appropriately depending on the space for the power supply terminal on the board, the required contact pressure, etc. In addition, the size of the spring can be formed freely. The power supply terminal 21 realizes a power supply terminal, which does not easily reach the yield point against the degree of deformation caused by an impact with use of its characteristics provided from the wire material, and has a fine following-up property against changes.

In the power supply terminal 21, so as to deal with vibration or movement of the battery caused by an external impact, as shown in FIG. 6A, each of the respective insertion fixing sections 21a is fixed by the printed circuit board (PCB) 23 provided in the apparatus body, and the electrode contact section 21c is used as a free end. When the battery 15 is fitted, the power supply terminal 21 comes into contact with two electrodes 24 of the battery 15 in a manner of closely adhering and connects electrically thereto. Thus the power supply terminal 21 can receive the feeding from the battery 15. Incidentally, on the printed circuit board 23, there are mounted a control processing unit (CPU), which process signals input by key, input optically, input by receiving electric waves, input by voice, and input through a detachable recording medium, and performs driving control for an internal circuit of a display section etc. In addition, there is mounted a power supply circuit, which deals with the power supply fed from the battery.

A single contact may be enough to come into contact with the electrode 24 of the battery 15. However, in the power supply terminal 21 according to the embodiment, the twisted coil spring is configured substantially bisymmetrically, and thus two electrode contact sections 21c are provided. Therefore, the contact resistance and conductor resistance of the power supply terminal become half. At the same time, a stable contact state can be obtained through two coil spring sections 21b, and thus durability and elasticity of the power supply terminal are improved.

With the power supply terminal described above, it is possible to realize a terminal, which does not easily reach the yield point against the degree of the deformation caused by impacts with use of the characteristics prepared by the wire material, and has a fine following-up property against changes. Further, since the power supply terminal has the twisted coil springs, the power supply terminal has the following advantages.

The power supply terminal can be in contact with the electrode of the battery with pressure (force with which the power supply terminal is in contact with the electrode of the battery) that does not change much against the degree of the deformation of the power supply terminal caused by the movement of the battery, i.e., with the constant pressure. In particular, the power supply terminal is suitable for a battery having an electrode at the corner thereof, for example, a packed lithium ion battery.

In regard to the manufacturing cost, the cost of a mold is not required in comparison with a conventional terminal in terms of the blade spring production by pressing, and thus the low cost manufacturing can be realized. It is obvious that the equivalent action and effect to the power supply terminal 21 can be obtained in the power supply terminal 22. By changing the shape of the section to be mounted on the PC board 23, the power supply terminal 22 can prevent a wrong terminal from being fitted.

Figure 7:
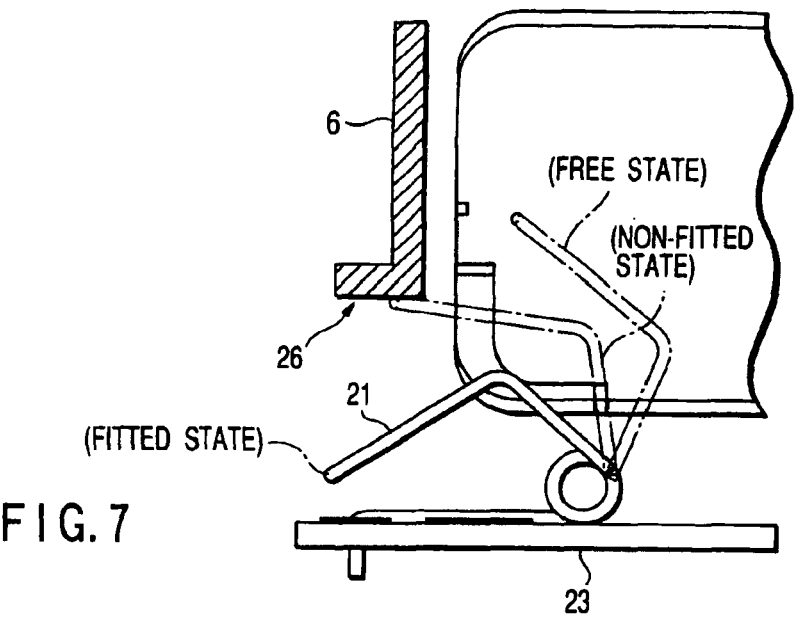
FIG. 7 is an enlarged view around the power supply terminal for explaining the state of the operation of fitting a battery according to the invention.

Next, the operation state in fitting a battery in the mobile information terminal apparatus with the aforementioned power supply terminal mounted will be illustrated in FIG. 7 and described.

In the present embodiment, a stopper 26 is provided in the apparatus body in advance. In the state where a battery is not fitted, the coil spring sections 21c and 22c of the respective power supply terminals 21 and 22 are mounted in the state where the relevant spring sections has been bent by being pressed to a certain extent from their free states.

Figure 8A:
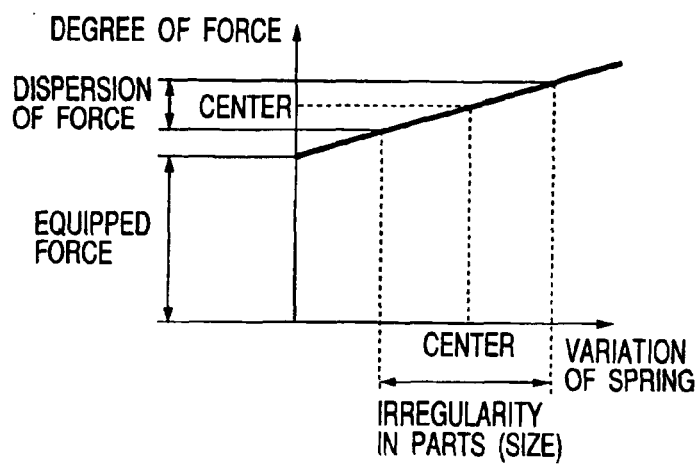
FIGS. 8A and 8B are diagrams for explaining the relation between variation and degree of force of a spring in the power supply terminal according to the invention and in a conventional power supply terminal.
Figure 8B:
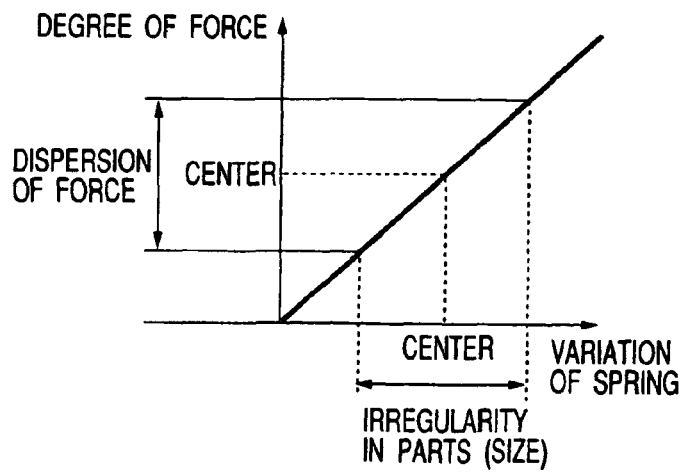
Figure 9A:
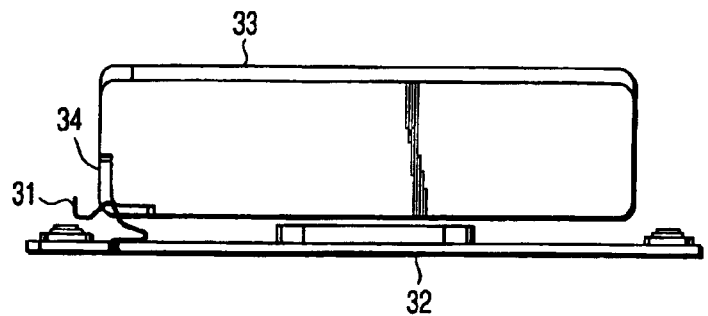
FIGS. 9A, 9B, and 9C are views showing a state of an operation state of mounting a battery with the conventional power supply terminal mounted in a mobile information terminal apparatus.
Figure 9B:
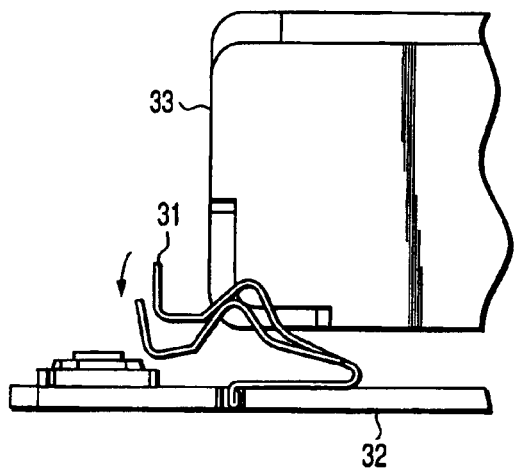
Figure 9C:
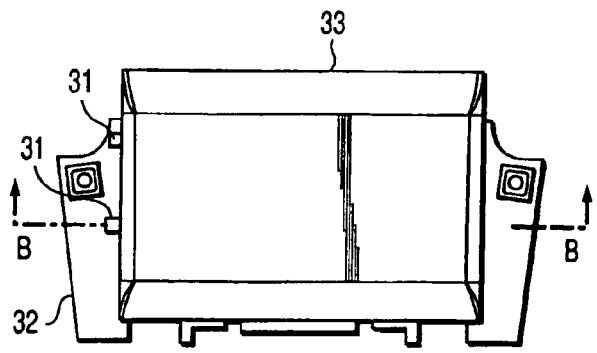

In the state set as described above, the force that has been applied (equipped force) is set high and the spring constant is set low. In this case, as shown in FIG. 8A, the change in the spring force against the change in the size of parts results in a small degree. (The degree of the inclination is small.) Therefore, in case where there is irregularity in parts, the dispersion of the spring force can be suppressed to the low extent without changing the design center value of spring force. On the contrary, in the case of the aforementioned structure with use of a conventional blade spring shown in FIGS. 9A, 9B, and 9C, the degree of spring force changes as shown in FIG. 8B. It is found that the irregularity in parts has a great influence on the spring force. In the case where the spring is displaced largely in a small volume in which the battery terminal can be disposed, there is a fear that the allowable stress of the material is exceeded.

According to the embodiment, even in the state where the battery is taken off, the coil spring sections 21c and 22c are in contact with the spring stopper 26, and thus the spring is not displaced much more than necessary. Therefore, it is possible to prevent the case such that the coil spring sections 21c and 22c stand up too much in fitting or taking off the battery with a result of becoming obstacles or being deformed.

Consequently, since the mobile information terminal apparatus according to the embodiment employs the power supply terminal with simple structure having a coil spring, it does not occur that the material of the power supply terminal reaches the yield point owing to an external impact etc. The power supply terminal is in contact with the electrode of the battery in an energized manner. Therefore, even in the case where the fitted battery moves slightly owing to an external impact etc., the power is supplied intermittently.

As described above, according to the invention, it is possible to provide a mobile information terminal apparatus, which prevents the occurrence of electric interruption between a self-contained battery and a power supply terminal of an apparatus caused by impact applied externally so as to perform the stable feeding continuously, and thus prevents a processing operation stop or a loss of data from occurring.

What is claimed is:

1. A mobile information terminal apparatus comprising:
   an input section to input information;
   a display section to display information;
   a control unit including a board mounted with a circuit element to control a processing of the input information and the display section;
   a battery housing section which is adapted to house a battery for supplying power to components of the apparatus, said battery housing being provided in a body of the mobile information terminal apparatus;
   a battery cover configured to detachably cover the battery housing section, and
   a power supply terminal provided in the battery housing section, said power supply terminal comprising:
     at least one electrode contact section which comes into contact with an electrode of the battery to receive a power feed from the battery when the battery is fitted in the battery housing section; and
     a twisted coil spring section which brings the electrode contact section into contact with the electrode;
   wherein when the battery moves due to an external impact on the apparatus, the electrode contact section moves so as to remain in contact with the battery.

2. A mobile information terminal apparatus comprising:
   an input section to input information;
   a display section to display information;
   a control unit including a board mounted with a circuit element to control a processing of the input information and the display section;
   a battery housing section which is adapted to house a battery for supplying power to components of the apparatus, said battery housing being provided in a body of the mobile information terminal apparatus;
   a battery cover configured to detachably cover the battery housing section;
   a power Supply terminal provided in the battery housing section, said power supply terminal comprising: (i) at least one electrode contact section which comes into contact with an electrode of the battery to receive a power feed from the battery when the battery is fitted in the battery housing section; and (ii) a twisted coil spring section which brings the electrode contact section into contact with the electrode; and
   a stopper to restrict a movable range of the electrode contact section;
   wherein the stopper restricts the movable range and applies an equipped force even when the battery is not fitted in the apparatus, so as to reduce a degree of change in spring forces between a state in which the battery is fitted and a state in which the battery is not fitted.

3. The apparatus according to claim 2, wherein the at least one electrode contact section comprises a plurality of electrode contact sections which come into contact with the electrode of the battery.

4. The apparatus according to claim 2, wherein the twisted coil spring section comprises a first section which is fixed on the board, a second section which comes into contact with the electrode of the battery when the battery is fitted in the battery housing section, and a twisted coil spring between the first section and the second section.

5. A mobile information terminal apparatus comprising:
   an input section to input information;
   a display section to display information;
   a control unit including a board mounted with a circuit element to control a processing of the input information and the display section;
   a battery housing section which is adapted to house a battery for supplying power to components of the apparatus, said battery housing being provided in a body of the mobile information terminal apparatus;
   a battery cover configured to detachably cover the battery housing section; and
   a power supply terminal provided in the battery housing section;
   wherein the power supply terminal is formed of a wire having elasticity, and comprises:
     two insertion fixing sections, each comprising a section which is bent into an L-shape for fixing on the board at an end thereof;
     at lease one electrode contact section which comes into contact with an electrode of the battery so as to receive a power feed from the battery when the battery is fitted in the battery housing section; and
     two coil spring sections, each of which extends from a respective one of the insertion fixing sections and is wound so as to function as an elastic member, which bring the electrode contact section into contact with the electrode when the battery is fitted in the battery housing section;
   wherein the electrode contact section is raised at a predetermined angle from ends of the coil spring sections, and an upper portion of the raised electrode contact section is bent into a dogleg shape.

6. The apparatus according to claim 5, wherein:
   the wire of the power supply terminal is made of a spring material having low resistance, and
   a surface of the wire is plated with nickel.

7. The apparatus according to claim 6, wherein the spring material is one of beryllium copper and phosphor bronze.

8. The apparatus according to claim 6, wherein the surface of the wire which is plated with nickel is plated with gold over the nickel.

9. The apparatus according to claim 5, wherein the wire of the power supply terminal is made of stainless steel.

* * * * *